Figure 1:
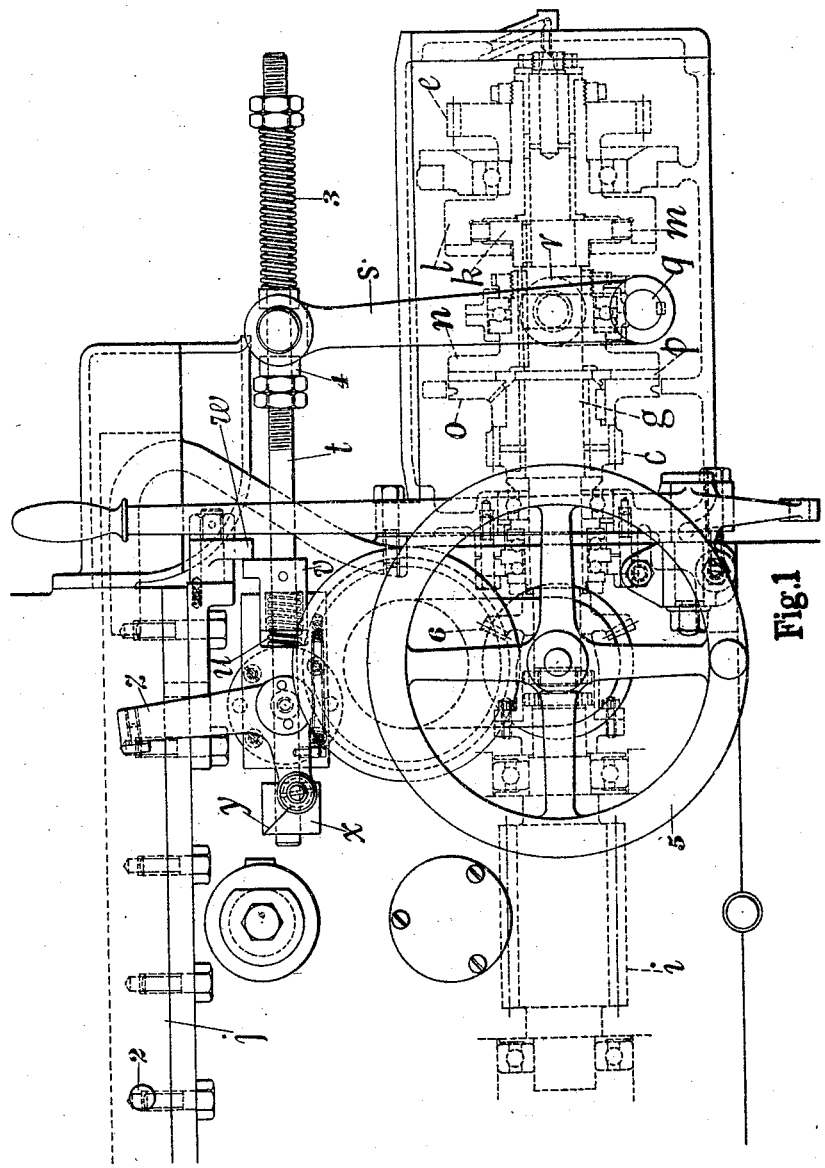

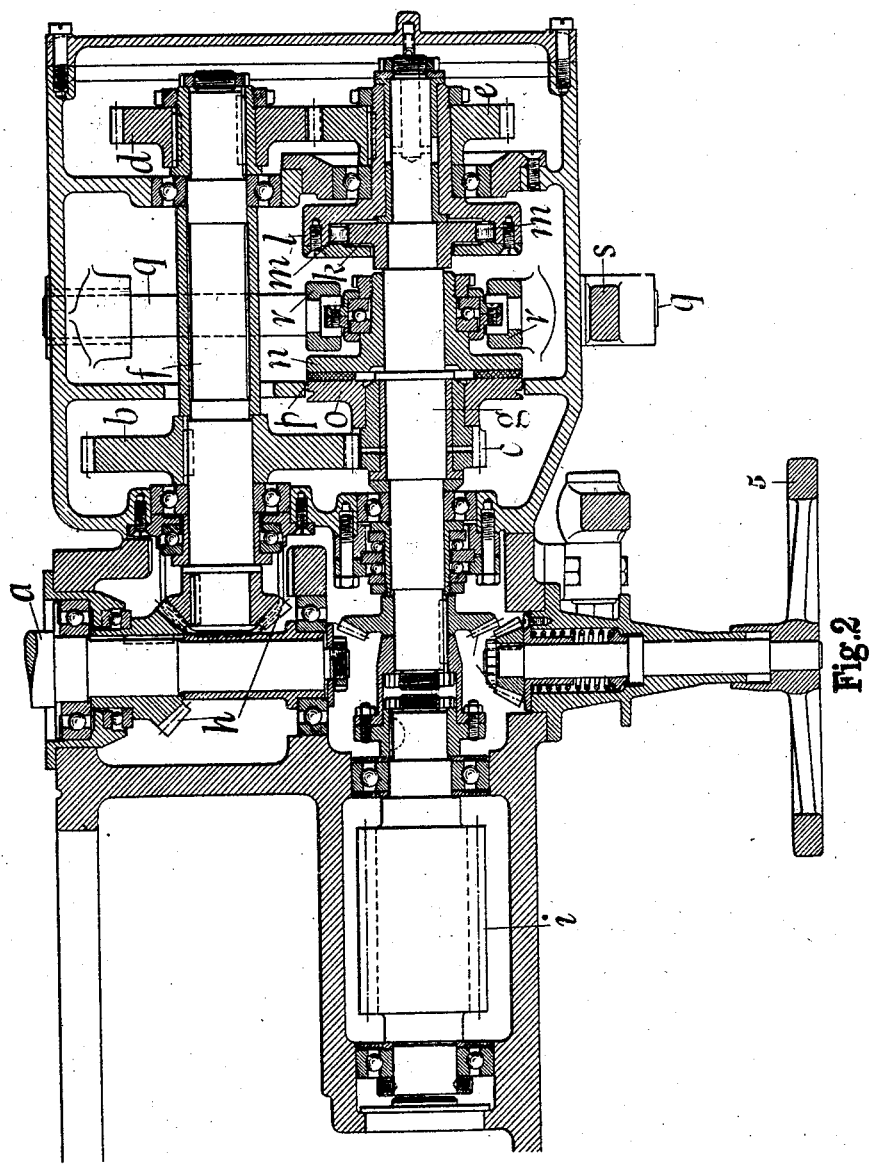

Patented May 11, 1926.

1,584,640

UNITED STATES PATENT OFFICE.

HARRY FRED LEE ORCUTT AND JOHN WILDSMITH SNARRY, OF BIRMINGHAM, ENGLAND, ASSIGNORS TO THE GEAR GRINDING COMPANY LIMITED, OF BIRMINGHAM, ENGLAND.

QUICK-RETURN MOTION.

Application filed October 9, 1924. Serial No. 742,705.

This invention relates primarily to grinding machines of the kind in which a rotating grinding wheel or disc is carried on a reciprocatory slide and is traversed to and from the work by a crank acting on the slide. The invention is, however, applicable to other reciprocatory mechanisms. For example it may be applied to machine tools of the shaping, planing or slotting machine type.

The object of the invention is to provide improved means for effecting the return strokes of the slide or the like at a higher rate than the operative strokes.

The invention comprises the employment in conjunction with a crank, cam or other means for reciprocating a slide, of a two speed gear for transmitting motion from a driving shaft to the slide through the crank or the like, an automatic one-way clutch in conjunction with one part of the two speed gear for effecting the operative stroke, and a friction or other clutch in conjunction with the other part of said gear for effecting the return stroke, the arrangement being such that when the friction or other clutch is in action the one-way clutch is overrun, whilst when the friction or other clutch is released the one-way clutch automatically comes into action.

The invention also comprises means as hereinafter described whereby the slide is enabled to control the friction clutch automatically.

Referring to the two accompanying sheets of explanatory drawings:—

Figure 1 is a side elevation, and Figure 2 a plan showing an application of our invention to the gear grinding machine as aforesaid. Essentially the same mechanism is, however, applicable to other machines in which a reciprocatory slide is employed.

Referring to the drawings, the driving shaft $a$ is connected to the slide reciprocatory mechanism through a two speed gear which consists of two pairs of toothed wheels, $b$, $c$, and $d$, $e$, mounted on a pair of parallel shafts $f$, $g$. Motion is transmitted to the shaft $f$ from the shaft $a$ through bevel wheels $h$. The wheels $b$, $d$, on the first of the two shafts ($f$) are secured thereto, whilst the other wheels $c$, $e$, are free on the second shaft $g$ which is coupled to the slide reciprocatory mechanism. The two pairs of wheels have different speed ratios. One pair ($d$, $e$,) produce the operative stroke of the slide, and the other ($b$, $c$,) the return stroke at a higher rate of speed.

The motion of the shaft $g$ is taken through a worm $i$ to a worm wheel (not shown). The worm wheel drives a reciprocatory slide $j$ (Figure 1) through a crank and connecting rod (also not shown). In the drawing only a portion of the slide $j$ is illustrated. The mode of actuating the slide is immaterial to the invention. The invention is concerned, in the example illustrated, with imparting motion in the required manner to the shaft $g$ from the shaft $a$. Any suitable mechanism may be arranged between the shaft $g$ and the slide.

Either of the above mentioned pair of wheels can be connected to the second shaft through a clutch. The clutch for imparting the operative stroke is an automatic one-way clutch consisting of a central portion $k$ secured to the shaft and an outer portion $l$ secured to the wheel $e$. Between the parts are arranged a system of rolls $m$ or pawls whereby the outer part is able to transmit motion to the inner part, whilst permitting the inner part to overrun it when driven by the shaft. On an adjacent part of the shaft is secured a disc $n$ forming one element of a friction clutch which co-operates with the complementary clutch element $o$ on the adjacent wheel $c$ of the other pair. Any suitable provision such as a disc $p$ of fibre or the like is provided on the one clutch element to effect a proper driving connection between the clutch parts. Control of the friction clutch is effected as hereinafter described.

In the operation of the mechanism, the friction clutch is inactive during the operative stroke. Motion is then imparted to the slide actuating mechanism through the one-way clutch. At or near the end of the operative stroke the friction clutch is brought into action, and as this drives the aforesaid second shaft $g$ at a highter rate than the one-way clutch, the central part of the one-way clutch overruns the outer part. At or near the end of the return stroke, which as already stated is effected at a relatively high speed, the friction clutch is put out of action, and the drive is taken up by the one-way clutch. Such an arrangement enables the transition from one speed to another to be effected very smoothly, so that no shock or jar is set up when the speeds are changed. It will be observed that the alteration of speed is effected without varying the direction or rate of motion of the gearing, and without any discontinuity of motion.

Although a friction clutch is preferred any other suitable clutch may be employed.

For controlling the friction clutch we employ a mechanism as follow: On the outer end of a spindle $q$ carrying a fork $r$ which engages the axially movable element $n$ of the friction clutch, a lever $s$ is secured, and the outer end of this lever is connected to a slidable rod $t$ or bar which can transmit motion to the lever in the one direction under the action of a spring $u$ surrounding the bar, the reverse movement being effected by a collar $v$ on the bar. The bar is actuated in the direction for bringing the clutch into action by a projection $w$ on the slide of the machine, which engages the collar $v$ on the bar. The bar also carries a stop collar $x$ having one end or face inclined (as shown at $y$) and formed with a recess or notch or shoulder at the lower end of the inclined portion. One end of a bell crank lever $z$ pivoted on the adjacent stationary part of the machine cooperates with the notched portion or shoulder of the said collar $x$ for holding the clutch in action. In Figure 1 the lever is shown in the engaging position. The lever is knocked aside for releasing the collar by a projection 2 on the slide.

At or near the end of the operative stroke, the first mentioned projection $w$ on the slide engages the collar $v$ on the bar $t$ and imparts to the latter, against the action of the spring $u$, the movement required to bring the clutch into action, the pressure exerted between the clutch parts being determined by a spring 3 on the bar. This spring forms part of the means whereby the connection between the lever $s$ and bar $t$ is effected, the other means being a collar 4. During this movement the collar with the inclined face on which one end of the bell crank lever rests, recedes from the lever and eventually allows the lever to engage the notch or shoulder on the collar as shown in Figure 1. The interaction of collar and lever holds the clutch in action. At or near the end of the return stroke the other projection 2 actuates the bell crank lever and by releasing it from the collar allows the spring $u$ to return the rod $t$ and consequently the clutch lever $s$ to the original position.

The hand wheel 5 and bevel wheels 6 shown in Figure 2 are used for imparting motion to the shaft $g$ by hand when setting up the machine.

By this invention we are able to effect the alternate strokes of a slide at different speeds in a manner which is particularly advantageous for machines of the kind described. When it is required to vary the rate of operation of either or both strokes, it is only necessary to change the gear wheels. As it is the speed of the operative stroke only which usually requires to be varied, the wheels which effect the said stroke are arranged at the outer end of their shafts where they are readily accessible.

The invention is not limited to any particular use, neither is it limited to any particular form or arrangement of variable speed gearing or clutches as these may be modified to suit different requirements.

Having thus described our invention what we claim as new and desire to secure by Letters Patent is:—

1. In quick-return reciprocatory mechanisms, the combination of a driving shaft, a slide, a two speed gear for transmitting motion from the shaft to the slide, said two speed gear including power transmitting elements, an automatic one-way clutch connected with one element of the two speed gear for effecting the operative stroke of the slide, and a friction clutch connected with another element of the gear for effecting the return stroke, together with means for intermittently actuating the friction clutch whereby the latter is rendered inoperative during the operative stroke of the slide, substantially as described.

2. In quick-return reciprocatory mechanisms, the combination of a driving shaft, a slide, two pairs of gear wheels of different speed ratios receiving motion from said shaft, a pair of parallel shafts carrying said gear wheels, a one-way clutch adapted to effect connection between one of the gear wheels of lower speed ratio and its shaft, and a friction clutch for effecting connection between one of the gear wheels of higher speed ratio and the same shaft, together with means for transmitting motion from said shaft to the slide, and means for transmitting intermittent operative movements from the slide to the friction clutch whereby the latter is rendered inoperative during the operative stroke of the slide, substantially as described.

3. In quick-return reciprocatory mechanisms as claimed in claim 1, the combination with the slide, of a bar, a lever adapted to lock the bar, means on the slide for imparting motion to the bar in one direction of motion of the slide and for releasing the locking lever in the reverse motion of the slide, and a lever for transmitting motion from the bar to the friction clutch, substantially as described.

In testimony whereof we have signed our names to this specification.

H. F. L. ORCUTT.
J. W. SNARRY.